US012559989B2

(12) United States Patent
Shiotsuki

(10) Patent No.: US 12,559,989 B2
(45) Date of Patent: Feb. 24, 2026

(54) LOCK APPARATUS AND STORAGE APPARATUS

(71) Applicant: NIHON PLAST CO., LTD., Fujinomiya (JP)

(72) Inventor: Takahito Shiotsuki, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 70 days.

(21) Appl. No.: 18/430,693

(22) Filed: Feb. 2, 2024

(65) Prior Publication Data

US 2024/0263490 A1 Aug. 8, 2024

(30) Foreign Application Priority Data

Feb. 8, 2023 (JP) ................................ 2023-017789

(51) Int. Cl.
*E05B 65/52* (2006.01)

(52) U.S. Cl.
CPC ................................ *E05B 65/5261* (2013.01)

(58) Field of Classification Search
CPC ...... E05B 65/5261; E05B 83/30; E05B 83/28; E05B 77/36; E05B 79/08; E05B 85/00; E05B 85/24; E05B 63/14; E05B 63/22; E05C 9/043; E05C 9/04; E05C 9/042; E05C 21/00; B60R 7/04; B60R 7/06; Y10T 292/68; Y10T 292/0961
USPC ............................................................. 70/63
See application file for complete search history.

(56) References Cited

U.S. PATENT DOCUMENTS 7,455,333 B2 * 11/2008 Ookawara ............... E05B 83/30 292/34
10,435,921 B2 * 10/2019 Nakasone ............... E05C 9/043
11,821,244 B2 * 11/2023 Nakasone ............... E05C 9/043
12,044,049 B2 * 7/2024 Nakasone ............... E05B 79/06
2004/0168487 A1 * 9/2004 Sawatani .................. B60R 7/06 70/145
2014/0008921 A1 1/2014 Shimizu
2017/0044803 A1 2/2017 Nakasone
2021/0140204 A1 * 5/2021 Minnich ................. E05B 79/08
2022/0341224 A1 * 10/2022 Minnich ................. E05B 81/06
(Continued)

FOREIGN PATENT DOCUMENTS

CN 101195360 A * 6/2008 ............... E05B 7/06
CN 110805366 A * 2/2020 ............. E05B 79/10
(Continued)

*Primary Examiner* — Steven A Tullia
(74) *Attorney, Agent, or Firm* — Amin, Turocy & Watson, LLP

(57) ABSTRACT

To provide a lock apparatus and a storage apparatus suppressing rattling at a connecting portion that connects a rotation body and a lock body. The lock apparatus includes connecting portion 30 that rotatably connects an end side of lock body 12. At least one of connecting portions 30 includes a rotation body-shaped protrusion portion 32*b*, cylindrical holding wall portion 43 that holds an outer peripheral surface of protrusion portion 32*b*, and retaining portion 46 protruding from holding wall portion 43, and has insertion portion 33*b* that rotatably receives protrusion portion 32*b*. Holding wall portion 43 and retaining portion 46 are set in pairs in a direction inclined with respect to a longitudinal direction and a width direction of lock body 12 when viewed from the insertion direction of protrusion portion 32*b* into insertion portion 33*b*.

17 Claims, 6 Drawing Sheets

(56) References Cited

U.S. PATENT DOCUMENTS

| | | | | |
|---|---|---|---|---|
| 2023/0313577 | A1* | 10/2023 | Ishii | E05C 9/10 292/33 |
| 2024/0263494 | A1* | 8/2024 | Minnich | E05B 79/08 |

FOREIGN PATENT DOCUMENTS

| | | | | | |
|---|---|---|---|---|---|
| CN | 211573014 | U * | 9/2020 | | E05B 83/30 |
| CN | 113585893 | A * | 11/2021 | | E05B 83/30 |
| GB | 2540085 | A * | 1/2017 | | E05B 83/30 |
| JP | 2012-132546 | | 10/2012 | | |
| JP | 2015-163282 | | 10/2015 | | |
| JP | 2019-023379 | | 2/2019 | | |
| JP | 2020060027 | A * | 4/2020 | | E05C 21/00 |
| KR | 20210051154 | A * | 5/2021 | | E05C 9/04 |
| KR | 20210081728 | A * | 7/2021 | | B60R 7/04 |
| WO | WO-2012132546 | A1 * | 10/2012 | | E05B 63/22 |
| WO | WO-2013105387 | A1 * | 7/2013 | | E05B 77/36 |
| WO | WO-2015125687 | A1 * | 8/2015 | | E05C 9/045 |
| WO | WO-2017078121 | A1 * | 5/2017 | | E05B 83/30 |
| WO | WO-2018008598 | A1 * | 1/2018 | | B60R 7/06 |
| WO | WO-2020080342 | A1 * | 4/2020 | | B60R 7/06 |
| WO | WO-2020080344 | A1 * | 4/2020 | | E05C 9/047 |
| WO | WO-2021062149 | A1 * | 4/2021 | | E05B 83/30 |
| WO | WO-2021085342 | A1 * | 5/2021 | | E05C 9/04 |

* cited by examiner

LOCK APPARATUS AND STORAGE APPARATUS

CROSS REFERENCE TO RELATED APPLICATIONS

This application is entitled to and claims the benefit of Japanese Patent Application No. 2023-017789 filed on Feb. 8, 2023, the disclosure of which including the specification, drawings and abstract is incorporated herein by reference in its entirety.

TECHNICAL FIELD

The present invention relates to a lock apparatus that can lock a second member to a first member and also release the lock, and a storage apparatus equipped with the same.

BACKGROUND ART

Conventionally, in an opening/closing apparatus such as a glove box mounted on a vehicle such as an automobile, a lock apparatus is used that locks a lid body, which is a second member, to a main body portion, which is a first member, so as to be openable and closable. In such a lock apparatus, tip portions of a pair of long rods, which are lock bodies, are inserted into a lock receiving portion in an urged state to lock the lid body, and a user such as an occupant slides or rotates an operating handle, so that in response to the operation of the operating handle, the rod resists urging and retreats from a lock receiving portion in a longitudinal direction, thereby releasing the lock.

A rotor, which is a rotatable rotation body, is used to interlock the pair of rods with the operation of the operating handle. The other end portions of the rods are rotatably connected to positions opposite to each other with respect to a rotation center of the rotor, and when the rotor rotates in response to an external force generated by the operation of the operating handle, the pair of rods move in opposite directions, so that one end portion of each of these rods is configured to be retreated from the lock receiving portion. A spherical protrusion portion provided on one side is inserted into an insertion portion recessed on the other side, and held by an elastic claw that is a retaining portion protruding from an inner wall portion of the insertion portion, so that the rotor and the other end portion of the rod are connected (For example, see Patent Literatures 1 to 3.)

CITATION LIST

Patent Literature

PTL 1
Republished Patent No. 2012/132546 (pages 4 to 10, FIGS. 1 to 4)
PTL 2
Republished Patent No. 2015/163282 (pages 4 to 7, FIGS. 1 to 4)
PTL 3
Japanese Patent Application Laid-Open No. 2019-23379 (Pages 4 to 10, FIGS. 1 to 4)

SUMMARY OF INVENTION

Technical Problem

However, in the case of the above configuration, the inner wall portions of the insertion portion that regulate the position of the protrusion portion are set in a planar shape, with one pair facing each other in the longitudinal direction of the rod and one pair facing each other in the width direction of the rod. As a result, it is difficult to maintain a large contact area between the outer peripheral surface of the spherical protrusion portion and the inner wall portion, and further measures are required to prevent rattling between the protrusion portion and the insertion portion.

The present invention was made in view of these points, and an object of the present invention is to provide a lock apparatus suppressing rattling at a connecting portion that connects a rotation body and a lock body, and a storage apparatus equipped with the same.

Solution to Problem

A lock apparatus of a first aspect is a lock apparatus capable of locking a second member with respect to a first member, and also capable of releasing the lock, the lock apparatus includes a rotation body that is rotatable and located on one of the first member and the second member; a pair of lock bodies that are movable in a first direction, and in which one end portion side of each is inserted into and removed from a pair of lock receiving portions provided in the other of the first member and the second member by respective movement; and a connecting portion that rotatably connects the other end side of one lock body to one side with respect to a rotation center of the rotation body, and rotatably connects the other end side of the other lock body to the other side with respect to the rotation center of the rotation body, in which at least one connecting portion includes a rotation body-shaped protrusion portion provided on one of the rotation body and the lock body, a cylindrical holding wall portion that holds an outer peripheral surface of the protrusion portion and a retaining portion that protrudes from the holding wall portion, and an insertion portion that is recessed in the other of the rotation body and the lock body to rotatably receive the protrusion portion, and the holding wall portion and the retaining portion are set in pairs in a direction that is inclined with respect to the first direction and a second direction orthogonal thereto, when viewed from an insertion direction of the protrusion portion into the insertion portion.

The lock apparatus according to a second aspect is configured such that in the lock apparatus according to the first aspect, the holding wall portion and the retaining portion are set in pairs in a plurality of directions that are inclined with respect to the first direction and the second direction, and are directions symmetrical to each other in the first direction when viewed from the insertion direction of the protrusion portion into insertion portion.

The lock apparatus according to a third aspect is configured such that in the lock apparatus according to the second aspect, at least one connecting portion has gap portions continuous to the insertion portion and located between the holding wall portions in the first direction and the second direction, respectively.

The lock apparatus according to a fourth aspect is configured such that in the lock apparatus according to any one of the first to third aspects, the protrusion portion has a spindle shape.

A storage apparatus according to a fifth aspect includes a main body portion that is a first member having an opening portion; a lid member that is a second member capable of opening and closing the opening portion; and the lock apparatus according to any one of the first to fourth aspects, which is provided on any one of the main body portion and the lid member, and locks the lid member to the main body portion in a state of closing the opening portion.

According to the lock apparatus according to the first aspect, the protrusion portion is held by the retaining portion while being sandwiched between the holding wall portions of the insertion portion with a large surface area without any clearance, and rattling at the connecting portion that connects the rotation body and the lock body can be suppressed.

According to the lock apparatus according to the second aspect, in addition to the effects of the lock apparatus according to the first aspect, the protrusion portion can be held by the retaining portion while being sandwiched between the holding wall portions of the insertion portion in a well-balanced manner with a large surface area without any clearance, so that rattling at the connecting portion can be suppressed more reliably.

According to the lock apparatus according to the third aspect, in addition to the effects of the lock apparatus according to the second aspect, the holding wall portion can be easily bent along the shape of the protrusion portion when the protrusion portion is inserted into the insertion portion, and the load during the insertion can be suppressed.

According to the lock apparatus according to the fourth aspect, in addition to the effects of the lock apparatus according to any one of the first to third aspects, the load during the insertion of the protrusion portion into the insertion portion can be suppressed.

According to the storage apparatus according to the fifth aspect, it is possible to provide the storage apparatus having a high-class feel, in which rattling during operation is suppressed.

DESCRIPTION OF EMBODIMENTS

Hereinafter, a first embodiment of the present invention will be described with reference to the drawings.

Figure 6A:
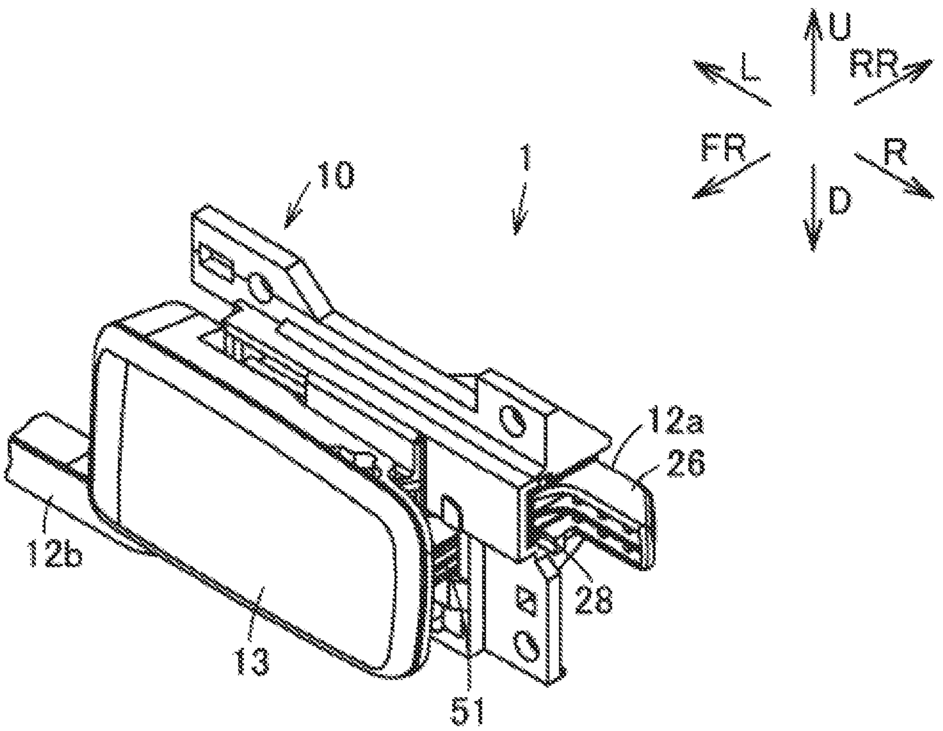
FIG. 6A is a perspective view of the lock apparatus, and illustrates from the front side.
Figure 6B:
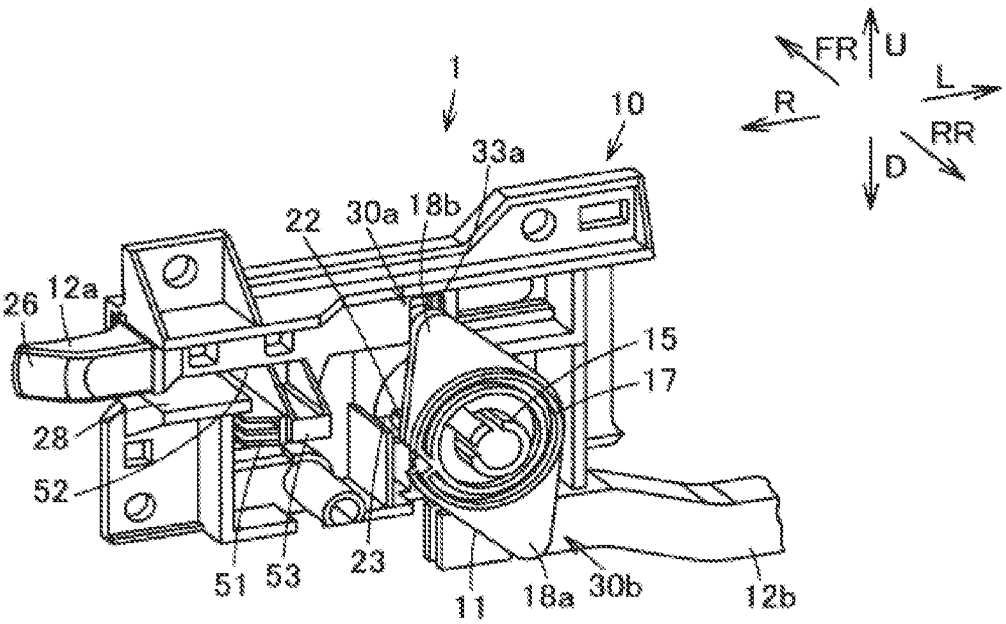
FIG. 6B is a perspective view of the lock apparatus, and illustrates from the rear side.
Figure 7:
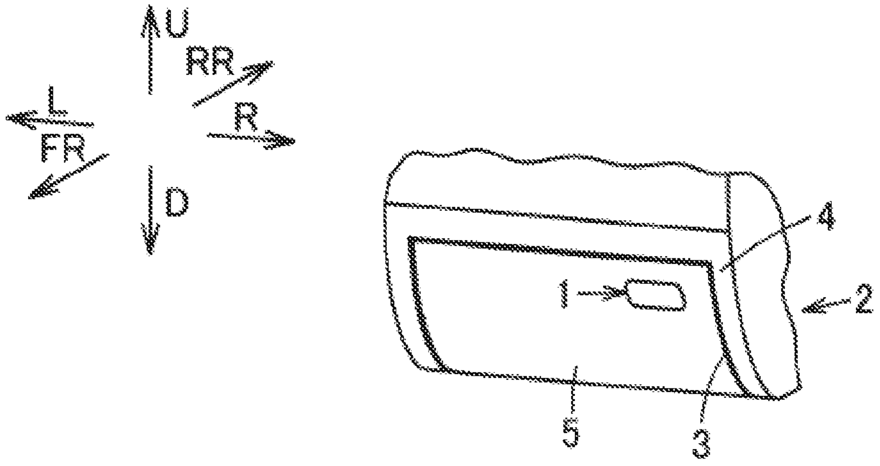
FIG. 7 is a perspective view illustrating a storage apparatus including the lock apparatus.

In FIGS. 6A and 6B, 1 indicates a lock apparatus. Lock apparatus 1 is capable of locking a second member with respect to a first member, and is also capable of releasing the lock. For example, the first member and the second member are used in an opening/closing apparatus or a storage apparatus. In the example illustrated in FIG. 7, lock apparatus 1 is used in storage apparatus 2. Storage apparatus 2 is, for example, a glove box for a vehicle. Storage apparatus 2 includes main body portion 4 that is the first member having opening portion 3 and lid member 5 that is the second member that opens and closes opening portion 3 of main body portion 4. Lid member 5 has a plurality of members, for example, an inner member and an outer member, and lock apparatus 1 is mainly disposed in a space portion between the inner member and the outer member in lid member 5. Lock apparatus 1 locks lid member 5 to main body portion 4 in a state where opening portion 3 is closed, and when the lock is released, lid member 5 can open opening portion 3.

Figure 4:
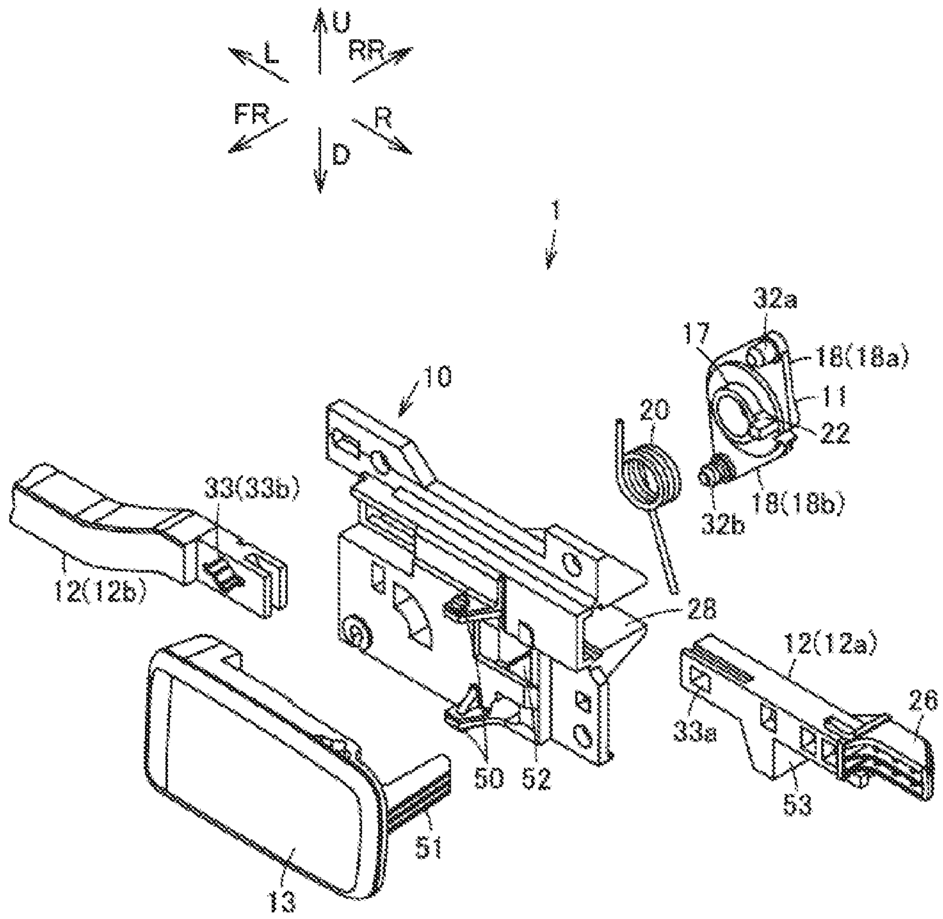
FIG. 4 is an exploded perspective view of the lock apparatus illustrated from a front side.
Figure 5:
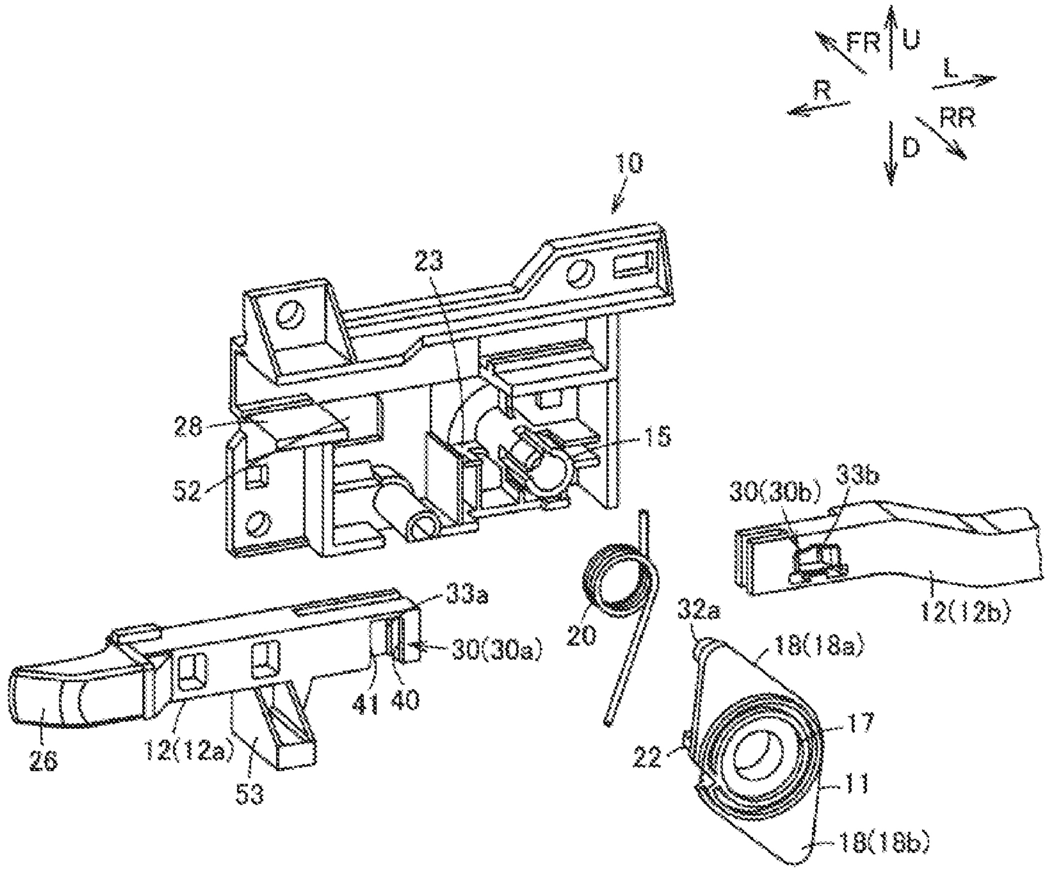
FIG. 5 is an exploded perspective view of a part of the lock apparatus illustrated from a rear side.

Lock apparatus 1 includes base body 10 illustrated in FIGS. 4 and 5. Base body 10 is also called a body portion, and is integrally attached to one of the first member and the second member, and in the present embodiment, the second member (lid member 5 (FIG. 7)). In the illustrated example, base body 10 is formed separately from any one of the first member and the second member, but is not limited thereto, and may be formed integrally. Rotation body 11 and a pair of lock bodies 12 are attached to base body 10. In the illustrated example, operated body 13 that is operated by a user such as a vehicle occupant to release the lock is further attached to base body 10.

In addition, hereinafter, front-rear directions are defined based on a direction seen from a user's side, and arrow FR direction in the drawing, which is the user's side, is a front or near side, and the opposite direction, which is arrow RR direction, is a rear or behind side. In the illustrated example, lock body 12 is disposed to extend in left-right directions (arrows L and R directions), and directions perpendicular to these front-rear and left-right directions (arrows U and D directions) are explained as up-down directions, but are not limited to these, and the left-right directions and the up-down directions may be changed as appropriate depending on an installation posture of lock apparatus 1.

Rotation body 11 is also called a rotor, and is an interlocking member that is interlocked by rotation to move or slide lock bodies 12 in opposite directions. Rotation body 11 is rotatably supported by support shaft 15 formed on base body 10 in the opposite direction. Therefore, rotation body 11 is rotatably supported by any one of the first member and the second member via base body 10. In the present embodiment, support shaft 15 protrudes, for example, at a rear portion of base body 10, that is, at a position opposite to operated body 13, and allows rotation body 11 to rotate left and right.

Rotation body 11 has supported portion 17 supported by support shaft 15 and a pair of arm portions 18 extending from supported portion 17 in a radial direction.

In the illustrated example, supported portion 17 is formed in a cylindrical shape, and support shaft 15 is inserted from the front side to the rear side. The pair of arm portions 18 extend on opposite sides, respectively with respect to the center of supported portion 17, that is, the rotation center of rotation body 11. In other words, the pair of arm portions 18 are located on one side and the other side with respect to the rotation center of rotation body 11. Lock body 12 is connected to each of arm portions 18. In the present embodiment, arm portions 18 are located above and below supported portion 17.

Preferably, rotation body 11 is urged in a rotational direction by urging means 20. Urging means 20 is, for example, a coil spring, a torsion spring, or the like, and is held on support shaft 15 on the front side of rotation body 11, that is, between rotation body 11 and base body 10, and has one end fixed to base body 10, and the other end fixed to rotation body 11. An urging direction of rotation body 11 by urging means 20 is a direction in which lock apparatus 1 holds the lock. In the present embodiment, rotation body 11 is provided with stopper portion 22 for regulating a rotation range of rotation body 11 against the urging by urging means 20. In the illustrated example, stopper portion 22 protrudes at the front portion of rotation body 11 and is configured to regulate the rotation range of rotation body 11 by abutting against stopper receiving portion 23 formed on base body 10.

Lock body 12 is an elongated member also called a rod, a pin, or the like. Lock body 12 is movable in a first direction, and is a slide member that locks the second member such that one end portion side (tip portion side) is inserted into and removed from a pair of lock receiving portions such as a hole portion provided in the other of the first member and the second member by respective movement. In the present embodiment, lock body 12 is movable in its longitudinal direction. That is, in the present embodiment, the first direction is the longitudinal direction of lock body 12, and is the left-right direction in the illustrated example.

In the present embodiment, a pair of lock bodies 12 are formed on the left and right sides of base body 10 and extend in the left-right directions with respect to base body 10. One lock body 12*a* located on the right side with respect to base body 10 has one end portion side, which is the right end side, extending from base body 10 to the right side, and other lock body 12*b* located on the left side with respect to base body 10 has one end portion side, which is the left end side, extending from base body 10 to the left side. Lengths of lock bodies 12*a* and 12*b* are set according to the disposition of lock apparatus 1 in storage apparatus 2 (FIG. 7), and in the present embodiment, one lock body 12*a* is longer than other lock body 12*b*. Lock body 12 has lock portion 26 formed at one end portion side extending from base body 10, and inserted into and removed from the lock receiving portion. In the drawing, lock portion 26 is illustrated only on one lock body 12*a*.

Further, in the present embodiment, at least one of lock bodies 12 is guided by base body 10 in the moving direction. In the illustrated example, one lock body 12*a* is held by guide portion 28 formed at the rear portion of base body 10 so as to be slidable in the left-right directions.

Further, each other end portion (base end portion) of lock body 12 is rotatably connected to arm portion 18 of rotation body 11 via connecting portion 30. In the present embodiment, the right end side of one lock body 12*a* is connected to one arm portion 18*a* on the upper side with respect to the rotation center of rotation body 11, and the right end side of other lock body 12*b* is connected to other arm portion 18*b* on the lower side with respect to the rotation center of rotation body 11.

Connecting portions 30 may each have the same configuration, but in the present embodiment, they have mutually different configurations. One connecting portion 30*a* that connects one lock body 12*a* and one arm portion 18*a* of rotation body 11 includes protrusion portion 32*a* formed on one of one lock body 12*a* and one arm portion 18*a* of rotation body 11, and insertion portion 33*a* formed on the other of one lock body 12*a* and one arm portion 18*a* of rotation body 11. In the present embodiment, protrusion portion 32*a* protrudes forward from a position near the tip portion of one arm portion 18*a* of rotation body 11, and insertion portion 33*a* is formed at the rear portion of one lock body 12*a*.

Figure 3A:
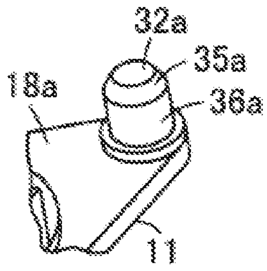
FIG. 3A is a perspective view of a protrusion portion of the connecting portion of the lock apparatus, and illustrates one protrusion portion.

Protrusion portion 32*a* illustrated in FIG. 3A has a rotation body shape having a rotating axis that is at least parallel or substantially parallel to a rotating axis of rotation body 11. In the present embodiment, protrusion portion 32*a* is formed in a substantially cylindrical shape. In the illustrated example, protrusion portion 32*a* is configured such that inclined portion 35*a* having a truncated conical shape or a circular truncated conical shape whose diameter decreases toward the tip side is formed, and cylindrical general portion 36*a* having a constant or substantially constant diameter dimension is formed over a base end portion continuing to a base end side of inclined portion 35*a*. In other words, protrusion portion 32*a* has a tapered tip portion due to inclined portion 35*a*.

Moreover, insertion portion 33*a* illustrated in FIG. 5 is a recessed portion into which protrusion portion 32*a* is inserted. In the present embodiment, insertion portion 33*a* is a portion into which protrusion portion 32*a* is loosely fitted. That is, in insertion portion 33*a*, there is a gap in which protrusion portion 32*a* can move slightly around protrusion portion 32*a*. Insertion portion 33*a* has abutting wall portions 40 and 41 that abut against protrusion portion 32*a* as one lock body 12*a* moves. In the present embodiment, abutting wall portions 40 and 41 are set on the left and right of insertion portion 33*a*, and have a planar shape extending in the front-rear directions and the up-down directions. That is, abutting wall portions 40 and 41 extend in a width direction of lock body 12, which is a direction that is intersecting or orthogonal to a moving direction of lock body 12.

Moreover, in the present embodiment, insertion portion 33*a* is a hole portion formed by penetrating one lock body 12*a* in the front-rear direction, which is a thickness direction. Further, the lower part of insertion portion 33*a* is open. That is, the lower part of insertion portion 33*a* directly communicates with the outside of one lock body 12*a*.

Figure 1A:
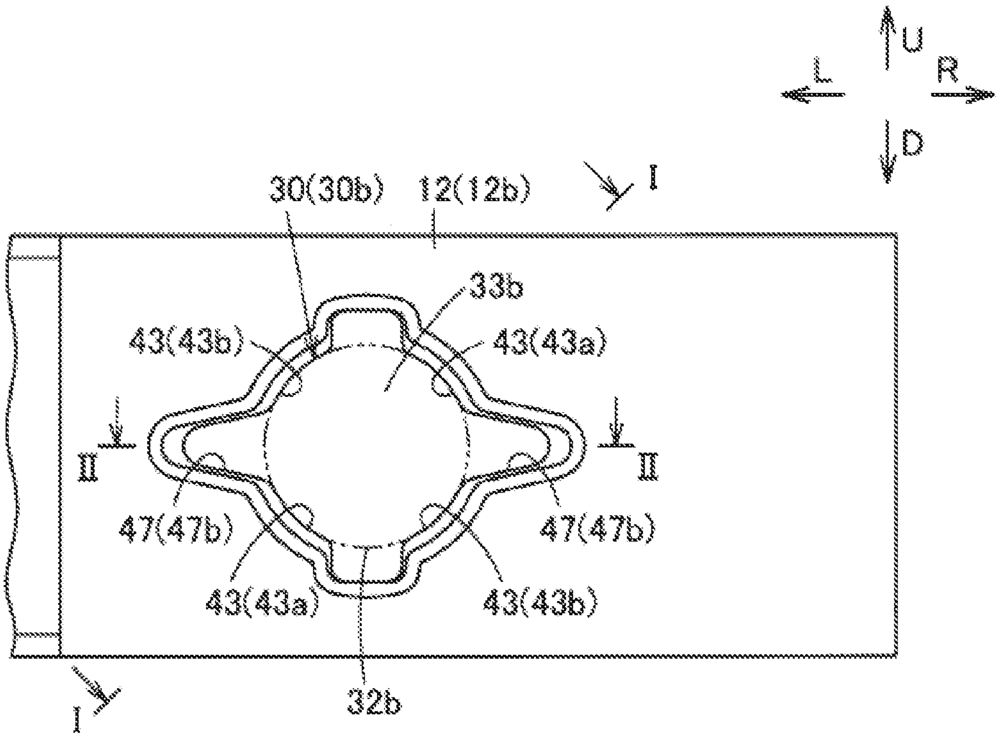
FIG. 1A illustrates a lock apparatus according to a first embodiment of the present invention, and is a front view of an insertion portion of a connecting portion.
Figure 1B:
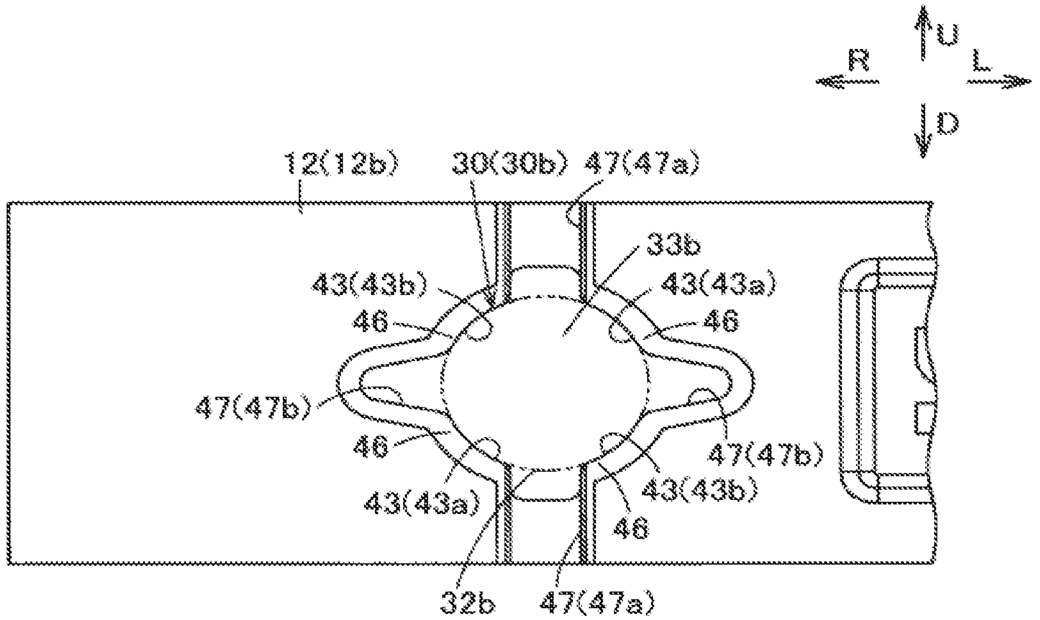
FIG. 1B illustrates the lock apparatus according to the first embodiment of the present invention, and is a rear view of the insertion portion of the connecting portion.
Figure 2A:
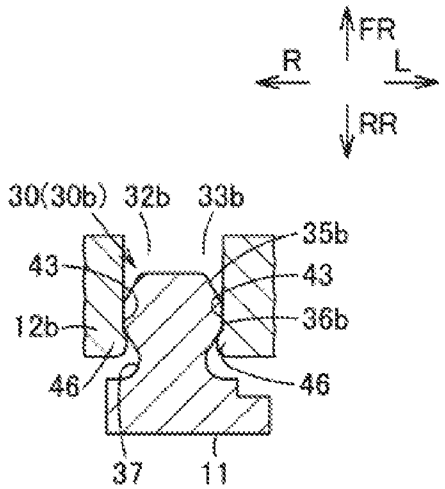
FIG. 2A is an end view of the lock apparatus, and illustrates a position corresponding to I-I in FIG. 1A.
Figure 2B:
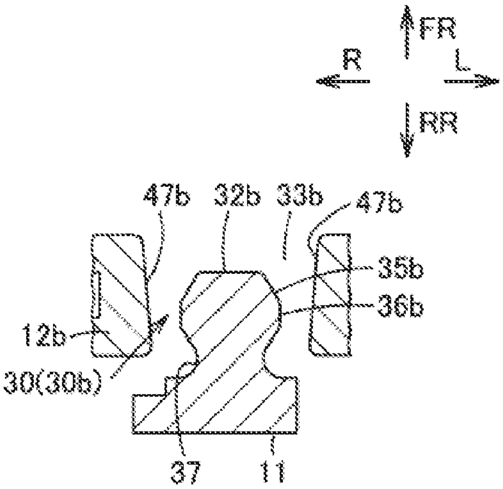
FIG. 2B is an end view of the lock apparatus, and illustrates a position corresponding to II-II in FIG. 1A.

Further, as illustrated in FIGS. 1A and 1B, other connecting portion 30*b* that connects other lock body 12*b* and other arm portion 18*b* of rotation body 11 includes protrusion portion 32*b* formed on one of other lock body 12*b* and other arm portion 18*b* of rotation body 11, and insertion portion 33*b* formed on the other of other lock body 12*b* and other arm portion 18*b* of rotation body 11. In the present embodiment, protrusion portion 32*b* protrudes forward from a position near the tip portion of other arm portion 18*b* of rotation body 11, and insertion portion 33*b* is formed at the rear portion of other lock body 12*b*.

Figure 3B:
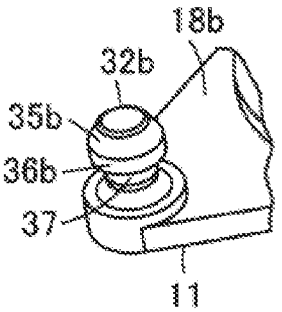
FIG. 3B is a perspective view of the protrusion portion of the connecting portion of the lock apparatus, and illustrates the other protrusion portion.

Protrusion portion 32*b* illustrated in FIG. 3B has a rotation body shape having a rotating axis that is at least parallel or substantially parallel to the rotating axis of rotation body 11. In the present embodiment, protrusion portion 32*b* has an aspherical shape and is formed in a spindle shape. In the illustrated example, protrusion portion 32*b* is configured such that inclined portion 35*b* having a truncated conical shape or a circular truncated conical shape whose diameter decreases toward the tip side, for example, at a constant or substantially constant rate, and cylindrical general portion 36*b* having a constant or substantially constant diameter dimension is formed continuing to a base end side of inclined portion 35*b*. Further, constricted portion 37 is formed at the base end portion of protrusion portion 32*b* continuing to the base end side of general portion 36*b*. Constricted portion 37 is formed in a truncated conical shape, a circular truncated conical shape, or a spherical shape whose diameter decreases toward the base end side. In other words, protrusion portion 32*b* has a tapered tip portion due to inclined portion 35*b*, a base end portion is constricted due to constricted portion 37, and a region between inclined portion 35*b* and constricted portion 37 is a maximum diameter region having a constant or substantially constant diameter dimension.

Insertion portion 33*b* illustrated in FIGS. 1A, 1B, 2A, and 2B is a recessed portion into which protrusion portion 32*b* is inserted. Insertion portion 33*b* is a through-hole portion formed by penetrating lock body 12*b* in the front-rear direction which is the thickness direction. In the present embodiment, insertion portion 33*b* is a portion into which protrusion portion 32*b* is fitted and held. That is, insertion portion 33*b* has holding wall portion 43 that holds an outer peripheral surface of protrusion portion 32*b*.

Holding wall portion 43 is formed into a cylindrical shape. Holding wall portion 43 has a cylindrical shape with a diameter dimension that is equal or approximately equal to the outer peripheral surface of general portion 36*b* of protrusion portion 32*b*. Therefore, holding wall portion 43 contacts or interferes with the outer peripheral surface of general portion 36*b* of protrusion portion 32*b* inserted into insertion portion 33*b* without having a gap.

Holding wall portions 43 are set in pairs in a direction inclined with respect to the left-right direction which is the longitudinal direction of lock body 12, and the up-down direction which is the width direction of lock body 12, when viewed from the insertion direction of protrusion portion 32*b* into insertion portion 33*b*, that is, from the rear to the front. Further, in the present embodiment, holding wall portions 43 are set in pairs in a plurality of directions that are inclined with respect to the left-right direction and the up-down direction when viewed from the rear to the front, and are symmetrical to each other in the left-right direction. In short, with respect to the central axis of protrusion portion 32*b* inserted into insertion portion 33*b*, holding wall portions 43 are set at diagonally upper and diagonally lower parts on both left and right sides, respectively, and holding wall portions 43*a* and 43*a*, and holding wall portions 43*b* and 43*b*, which face each other in a diagonal direction with respect to the central axis of protrusion portion 32*b*, form pairs, respectively.

Holding wall portion 43 is formed with retaining portion 46 that holds protrusion portion 32*b* from coming off from insertion portion 33*b*. Retaining portion 46 is a claw portion that is engaged with constricted portion 37 of protrusion portion 32*b* inserted into insertion portion 33*b*. Retaining portion 46 is set on the insertion side of protrusion portion 32*b* of each of holding wall portions 43, that is, an inner edge of the rear end portion in the present embodiment. Therefore, like holding wall portions 43, retaining portions 46 are set in pairs in a direction inclined with respect to the left-right direction which is the longitudinal direction of lock body 12, and the up-down direction which is the width direction of lock body 12, when viewed from the insertion direction of protrusion portion 32*b* into insertion portion 33*b*, that is, from the rear to the front. Further, in the present embodiment, retaining portions 46 are set in pairs in a plurality of directions that are inclined with respect to the left-right direction and the up-down direction when viewed from the rear to the front, and are symmetrical to each other in the left-right direction. In short, with respect to the central axis of protrusion portion 32*b* inserted into insertion portion 33*b*, retaining portions 46 are set at diagonally upper and diagonally lower parts on both left and right sides, respectively, and retaining portions 46 and 46, which are formed on holding wall portions 43*a* and 43*a*, and retaining portions 46 and 46, which are formed on holding wall portions 43*b* and 43*b* facing each other in a diagonal direction with respect to the central axis of protrusion portion 32*b*, form pairs, respectively.

Furthermore, gap portion 47 is formed between holding wall portions 43. Gap portion 47 reduces an insertion load by bending holding wall portion 43 when protrusion portion 32*b* is inserted into insertion portion 33*b*. Gap portion 47 is continuous with insertion portion 33*b* and is formed between holding wall portions 43*a* and 43*b*. In the present embodiment, gap portion 47 includes slit 47*a* formed between holding wall portions 43*a* and 43*b* that are adjacent to each other in the left-right direction that is the longitudinal direction of lock body 12, and notch portion 47*b* formed between holding wall portions 43*a* and 43*b* that are adjacent to each other in the up-down direction that is the width direction of lock body 12. Therefore, gap portion 47 allows each holding wall portion 43 to be elastically deformed in a direction away from the center portion of insertion portion 33*b* or the central axis of protrusion portion 32*b* inserted into lock body 12.

Slit 47*a* is formed to extend linearly in the up-down direction. Slit 47*a* is located on the insertion side of protrusion portion 32*b*, that is, at the rear portion thereof in insertion portion 33*b*. In the illustrated example, slit 47*a* is formed in the shape of groove at the rear portion of insertion portion 33*b*. Slit 47*a* is continuous from insertion portion 33*b* over the upper and lower parts of insertion portion 33*b*, and the upper end portion of slit 47*a* located at the end portion opposite to insertion portion 33*b*, that is, at the upper part of insertion portion 33*b*, and the lower end portion of slit 47*a* located at the lower part of insertion portion 33*b* communicate with the outside of lock body 12 and are open, respectively.

Notch portion 47*b* is formed to extend in the left-right direction. Like insertion portion 33*b*, notch portion 47*b* is formed by penetrating lock body 12*b* in the front-rear direction which is the thickness direction being continuous with insertion portion 33*b*. In the illustrated example, notch portion 47*b* is formed so that the width thereof gradually becomes narrower toward the tip portion side than the base end portion side which is insertion portion 33*b* side, that is, is tapered. Further, notch portion 47*b* gradually widens from the rear portion toward the front portion with respect to insertion portion 33*b*.

Further, operated body 13 illustrated in FIG. 4 is also called an operating handle. Operated body 13 is a member that is movably provided on base body 10, is exposed from any one (in the present embodiment, lid member 5 (FIG. 7)) of the first member and the second member to which lock apparatus 1 is attached, and operates with respect to base body 10 in response to an operation of the user, thereby moving lock body 12 and releasing (unlocking) the lock by lock apparatus 1. Since the pair of lock body 12 and rotation body 11 are integrally interlocked, operated body 13 can apply an external force to any one of the pair of lock body 12 and rotation body 11, and thereby lock body 12 can be moved in the unlocking direction. Operated body 13 may be configured to be slidable relative to base body 10 as long as operated body 13 operates to change its position or posture with respect to base body 10, and in the present embodiment, operated body 13 is rotatably supported in the left-right direction by shaft support portion 50 formed in the front portion of base body 10. In the illustrated example, operated body 13 is, for example, a plate-like member formed in a rectangular shape when viewed from the front.

Further, pressurizing portion 51 protrudes on the rear portion of operated body 13, that is, on the side facing base body 10, and pressurizing portion 51 is inserted from the front side to the rear side into hole portion 52 formed by penetrating base body 10 in the front-rear direction, and faces pressure receiving portion 53 of one lock body 12*a* held by guide portion 28 at the position of the rear portion of base body 10, as illustrated in FIG. 6B. That is, in the present embodiment, one lock body 12*a* is a lock body that is operated by receiving an external force directly from operated body 13, and other lock body 12*b* is a lock body that is indirectly operated via rotation body 11 with respect to the operation of operated body 13.

When assembling lock apparatus 1, first, rotation body 11, and lock bodies 12*a* and 12*b* are connected by connecting portion 30. That is, protrusion portion 32*a* formed on rotation body 11 is inserted between abutting wall portions 40 and 41 of insertion portion 33*a* formed on one lock body 12*a*, and protrusion portion 32*b* formed on rotation body 11 is inserted into insertion portion 33*b* formed on other lock body 12*b*.

At this time, when protrusion portion 32*b* is aligned with insertion portion 33*b* and pushed in, inclined portion 35*b* of protrusion portion 32*b* is first inserted between holding wall portions 43*a* and 43*a* and between the holding wall portions 43*b* and 43*b* of insertion portion 33*b*. Further, when protrusion portion 32*b* is pushed into insertion portion 33*b*, and general portion 36*b* of protrusion portion 32*b* abuts between retaining portions 46 and 46 formed on holding wall portions 43*a* and 43*a*, and between retaining portions 46 and 46 formed on holding wall portions 43*b* and 43*b*, holding wall portions 43*a* and 43*a*, and holding wall portions 43*b* and 43*b* are elastically pushed to be open by gap portion 47, and general portion 36*b* of protrusion portion 32*b* enters the inner part of insertion portion 33*b* while climbing over retaining portions 46 and 46. Then, when general portion 36*b* of protrusion portion 32*b* passes through retaining portions 46 and 46, and constricted portion 37 reaches the position of retaining portion 46, holding wall portions 43*a* and 43*a*, and holding wall portions 43*b* and 43*b* are deformed back, retaining portion 46 is caught on constricted portion 37, and protrusion portion 32*b* is engaged with and held in insertion portion 33*b* a state of being prevented from coming off.

After that, supported portion 17 of rotation body 11 is press-fitted into support shaft 15 of base body 10, and rotation body 11 together with urging means 20, urging means 20 and lock bodies 12*a* and 12*b* are assembled to the rear portion of base body 10, operated body 13 is rotatably assembled from the front portion of base body 10 to shaft support portion 50 of base body 10 while inserting pressurizing portion 51 into hole portion 52, pressurizing portion 51 faces pressure receiving portion 53 of one lock body 12*a*, and thereby lock apparatus 1 is assembled. Assembled lock apparatus 1 is attached to storage apparatus 2 by attaching base body 10 and other lock body 12*b* to the first member or the second member, for example, the inner member of lid member 5 illustrated in FIG. 7 in the present embodiment, and covering it with the outer member.

In lock apparatus 1, when lid member 5 is in the position where opening portion 3 is closed, rotation body 11 is urged by urging means 20, so that abutting wall portion 41 of insertion portion 33*a* abuts against protrusion portion 32*a*, and thereby one lock body 12*a* is pressed to the right side, protrusion portion 32*b* inserted into insertion portion 33*b* is pushed to the left side, thereby pressing other lock body 12*b* to the left side, and lock portions 26 and 26 of lock bodies 12*a* and 12*b* are held in a state of being inserted into the lock receiving portions, respectively, and lid member 5 is locked to main body portion 4.

Further, when releasing the lock by lock apparatus 1, if the user rotates operated body 13, pressurizing portion 51 of operated body 13 abuts against pressure receiving portion 53 of one lock body 12*a*, one lock body 12*a* is pressed to the left side via pressure receiving portion 53, and thereby one lock body 12*a* moves to the left side along guide portion 28 and abutting wall portion 40 of insertion portion 33*a* abuts against protrusion portion 32*a*, so that one arm portion 18*a* of rotation body 11 is pushed to the left side against the urging of urging means 20. Therefore, rotation body 11 rotates around support shaft 15, and other lock body 12*b*, which is connected to other arm portion 18*b* of rotation body 11 opposite to one lock body 12*a* via other connecting portion 30*b*, is pulled to the right side and moves to the right side as rotation body 11 rotates. That is, the pair of lock bodies 12 move in opposite directions each other via rotation body 11, lock portion 26 is pulled out from the lock receiving portion, and the lock by lock apparatus 1 is released.

As described above, according to the first embodiment, in insertion portion 33*b* that rotatably receives protrusion portion 32*b* of connecting portion 30, by setting holding wall portion 43 having the cylindrical shape and retaining portion 46 protruding from holding wall portion 43 of insertion portion 33*b* holding the outer peripheral surface of protrusion portion 32*b*, which form pairs in a direction inclined with respect to the left-right direction which is the longitudinal direction and moving direction of lock body 12, and the up-down direction which is the width direction orthogonal thereto, when viewed from the insertion direction of protrusion portion 32*b* into insertion portion 33*b*, protrusion portion 32*b* is held by retaining portion 46 while being sandwiched between holding wall portions 43 with a large surface area without any clearance, and rattling at connecting portion 30 can be suppressed.

Further, by setting holding wall portion 43 and retaining portions 46 in pairs in a plurality of directions that are inclined with respect to the left-right direction and the up-down direction when viewed from the insertion direction of protrusion portion 32*b* into insertion portion 33*b*, and are directions symmetrical to each other in the left-right direction, protrusion portion 32*b* can be held by retaining portion 46 while being sandwiched between holding wall portions 43 of insertion portion 33*b* in a well-balanced manner with a large surface area without any clearance, so that rattling at connecting portion 30 can be suppressed more reliably.

Furthermore, since gap portions 47, which are located between holding wall portions 43 continuous to insertion portion 33*b*, are formed in the left-right direction and the up-down direction, respectively, holding wall portion 43 can be easily bent along the shape of protrusion portion 32*b* when protrusion portion 32*b* is inserted into insertion portion 33*b*, and the load during the insertion can be suppressed.

Furthermore, in a case where the protrusion portion is spherical, when the protrusion portion is inserted into the insertion portion, the load continues to increase until the maximum diameter position of the protrusion portion passes between retaining portions 46 and 46, whereas by making protrusion portion 32*b* a spindle-shape, when protrusion portion 32*b* is inserted into insertion portion 33*b*, if inclined portion 35*b* passes between retaining portions 46 and 46, since general portion 36*b* having a constant or substantially constant diameter dimension passes between retaining portions 46 and 46, the load does not increase. Therefore, the load when inserting protrusion portion 32*b* into insertion portion 33*b* can be suppressed.

Therefore, since protrusion portion 32*b* can be easily attached to insertion portion 33*b* and held without rattling without setting a strong hook, or the like, the workability of connection by connecting portion 30 is improved, and since there is no need to apply an unreasonable load when inserting protrusion portion 32*b* into insertion portion 33*b*, in a case where protrusion portion 32*b* and insertion portion 33*b* are made of synthetic resin, it is possible to suppress whitening, scraping, or the like of protrusion portion 32*b* and insertion portion 33*b*.

Further, in the present embodiment, since the structure is such that one lock body 12*a* is moved by applying an external force directly to one lock body 12*a* by the operation of operated body 13, and rotation body 11 is directly pushed and rotated by one lock body 12*a*, even if there is some clearance between protrusion portion 32*a* and insertion portion 33*a* in one connecting portion 30*a* between one lock body 12*a* and rotation body 11, no rattling occurs during rotation of rotation body 11.

By including lock apparatus 1 described above, it is possible to provide storage apparatus 2 having a high-class feel, in which rattling during operation of operated body 13 due to rattling in connecting portion 30 is suppressed.

Figure 8:
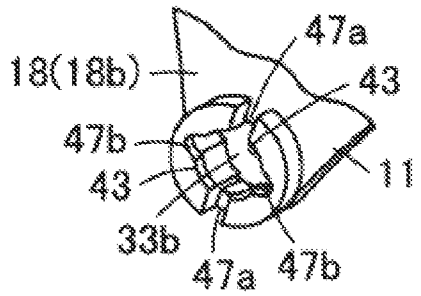
FIG. 8 is a perspective view illustrating a part of a lock body of a lock apparatus according to a second embodiment of the present invention.
Figure 9:
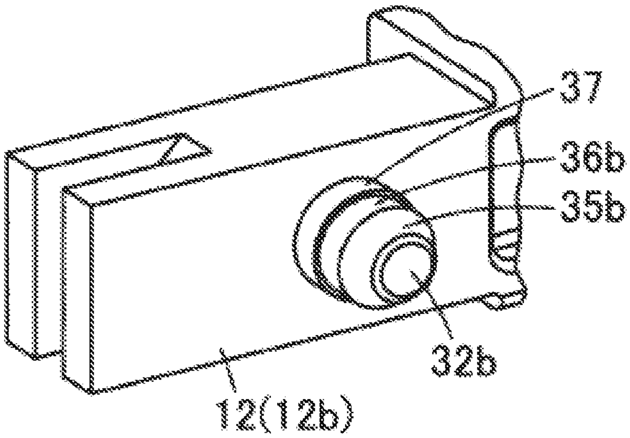
FIG. 9 is a perspective view illustrating a rotation body of the lock apparatus.

Note that in the first embodiment, protrusion portion 32*b* is formed on rotation body 11, and insertion portion 33*b* and gap portion 47 are formed on lock body 12, but the present invention is not limited to this, and as in the second embodiment illustrated in FIGS. 8 and 9, even if protrusion portion 32*b* is formed on lock body 12, and insertion portion 33*b* and gap portion 47 are formed on rotation body 11, as rattling in connecting portion 30 can be suppressed, and the like, the same effects as in the first embodiment can be achieved.

INDUSTRIAL APPLICABILITY

The present invention is suitably used for the lock apparatus which locks the lid member of the storage apparatus for vehicles, for example.

REFERENCE SIGNS LIST

1 lock apparatus
2 storage apparatus
3 opening portion
4 main body portion which is first member
5 lid member which is second member
11 rotation body
12 lock body
30 connecting portion
32*b* protrusion portion
33*b* insertion portion
43 holding wall portion
46 retaining portion
47 gap portion

What is claimed is:

1. A lock apparatus capable of locking a second member with respect to a first member, and also capable of releasing the lock, the lock apparatus comprising:

a rotation body that is rotatable and located on one of the first member and the second member;

a pair of lock bodies that are movable along a first axis, and in which one end portion side of each is inserted into and removed from a pair of lock receiving portions provided in the other of the first member and the second member by respective movement; and a connecting portion that rotatably connects the other end side of one lock body to one side with respect to a rotation center of the rotation body, and rotatably connects the other end side of the other lock body to the other side with respect to the rotation center of the rotation body, wherein at least one connecting portion includes a rotation body-shaped protrusion portion provided on one of the rotation body and the lock body, a cylindrical holding wall portion that holds an outer peripheral surface of the protrusion portion and a retaining portion that protrudes from the holding wall portion, and an insertion portion that is recessed in the other of the rotation body and the lock body to rotatably receive the protrusion portion, and the holding wall portion and the retaining portion are set in pairs in a direction that is inclined with respect to the first axis and a second axis orthogonal thereto, when viewed from an insertion direction of the protrusion portion into the insertion portion, wherein the insertion portion comprises a pair of notch portions arranged to face each other, each being provided between the holding wall portions.

2. The lock apparatus according to claim 1, wherein the holding wall portion and the retaining portion are set in pairs in a plurality of directions that are inclined with respect to the first axis and the second axis, and are directions symmetrical to each other in the first axis when viewed from the insertion direction of the protrusion portion into insertion portion.

3. The lock apparatus according to claim 2, wherein at least one connecting portion has gap portions continuous to the insertion portion and located between the holding wall portions in the first axis and the second axis, respectively.

4. The lock apparatus according to claim 1, wherein the protrusion portion has a spindle shape.

5. A storage apparatus comprising:

a main body portion that is a first member having an opening portion;

a lid member that is a second member capable of opening and closing the opening portion; and the lock apparatus according to claim 1, which is provided on any one of the main body portion and the lid member, and locks the lid member to the main body portion in a state of closing the opening portion.

6. The lock apparatus according to claim 1, wherein the insertion portion comprises a pair of slit portions arranged to face each other, and the pair of notch portions and the pair of slit portions are provided in a vertical orientation.

7. The lock apparatus according to claim 1, wherein the rotation body is biased toward a locked position by a spring disposed between a base body and the rotation body.

8. The lock apparatus according to claim 7, wherein the base body is formed as a separate member from the second member and is attached thereto.

9. The lock apparatus according to claim 1, wherein the lock apparatus further comprises an operated body attached to a base body, the operated body being operated by a user to rotate the rotation body.

10. The lock apparatus according to claim 1, wherein the pair of lock bodies extend in the first axis.

11. The lock apparatus according to claim 1, wherein the cylindrical holding wall portion comprises a plurality of gaps extending in an insertion direction of the protrusion portion.

12. The lock apparatus according to claim 1, wherein the retaining portion is provided as a claw portion protruding from the holding wall portion.

13. The lock apparatus according to claim 1, wherein the protrusion portion and the insertion portion are configured such that the protrusion portion is inserted with interference fit.

14. The lock apparatus according to claim 1, wherein the insertion portion includes gap portions continuous to the insertion portion and located between the holding wall portions in the first axis and the second axis, respectively.

15. The lock apparatus according to claim 1, wherein the rotation body is rotatably supported by a support shaft integrally formed with a base body.

16. The lock apparatus according to claim 1, wherein the gap portions between the holding wall portions in the first axis and the second axis are formed to allow elastic deformation of the holding wall portions.

17. The lock apparatus according to claim 1, further comprising:

an operating body including a pressing portion, wherein the pressing portion is configured to:

move the first lock body in the first axis;

rotate the rotation body, thereby move the second lock body in the first axis in conjunction with the rotation body, such that one end portion of each of the pair of lock bodies is simultaneously removed from the pair of lock receiving portions.

* * * * *